(12) United States Patent
Gupta et al.

(10) Patent No.: US 12,118,702 B2
(45) Date of Patent: *Oct. 15, 2024

(54) ARTIFICIAL INTELLIGENCE ARCHITECTURES FOR DETERMINING IMAGE AUTHENTICITY

(71) Applicant: Lendbuzz, Inc., Boston, MA (US)

(72) Inventors: Otkrist Gupta, Somerville, MA (US); Dan Raviv, Newton, MA (US); Hailey James, American Fork, UT (US)

(73) Assignee: LENDBUZZ, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,949

(22) Filed: Dec. 5, 2023

(65) Prior Publication Data

US 2024/0112318 A1    Apr. 4, 2024

Related U.S. Application Data

(63) Continuation of application No. 17/355,965, filed on Jun. 23, 2021, now Pat. No. 11,875,494.

(51) Int. Cl.
*G06T 7/00* (2017.01)
*G06F 18/214* (2023.01)
(Continued)

(52) U.S. Cl.
CPC .......... *G06T 7/0002* (2013.01); *G06F 18/214* (2023.01); *G06F 18/24* (2023.01);
(Continued)

(58) Field of Classification Search
CPC ........... G06K 9/00261; G06K 9/00288; G06K 9/00228; G06K 9/00268; G06K 9/00281; G06K 9/6202; G06K 2009/4666; G06K 9/00362; G06K 9/4642; G06K 9/6206; G06K 9/6255; G06K 9/6256;
(Continued)

(56) References Cited

U.S. PATENT DOCUMENTS 11,188,798 B1    11/2021  Goswami et al.
2017/0046550 A1*  2/2017  Lee .................... G06V 40/1376
(Continued)

OTHER PUBLICATIONS

U.S. Appl. No. 17/355,965, "Notice of Allowance", filed Sep. 13, 2023, 11 pages.

*Primary Examiner* — Quan M Hua
(74) *Attorney, Agent, or Firm* — Kilpatrick Townsend & Stockton LLP

(57) ABSTRACT

The present disclosure generally relates to systems that include an artificial intelligence (AI) architecture for determining whether an image is manipulated. The architecture can include a constrained convolutional layer, separable convolutional layers, maximum-pooling layers, a global average-pooling layer, and a fully connected layer. In one specific example, the constrained convolutional layer can detect one or more image-manipulation fingerprints with respect to an image and can generate feature maps corresponding to the image. The global average-pooling layer can generate a vector of feature values by averaging the feature maps. The fully connected layer can then generate, based on the vector of feature values, an indication of whether the image was manipulated or not manipulated.

20 Claims, 5 Drawing Sheets

(51) Int. Cl.
*G06F 18/24* (2023.01)
*G06N 20/00* (2019.01)
*G06Q 40/03* (2023.01)
*G06V 30/40* (2022.01)

(52) U.S. Cl.
CPC .............. *G06N 20/00* (2019.01); *G06Q 40/03*
(2023.01); *G06V 30/40* (2022.01); *G06T*
*2207/20081* (2013.01); *G06T 2207/20084*
(2013.01); *G06T 2207/30176* (2013.01)

(58) Field of Classification Search
CPC ........... G06K 9/00275; G06K 9/00308; G06K
9/00926; G06K 9/3233; G06K 9/4671;
G06K 9/6215; G06K 9/6228; G06K
9/6262; G06K 9/627; G06K 9/6276;
G06K 9/629; G06N 3/0454; G06N 3/084;
G06N 3/08; G06T 11/00; G06T
2207/10016; G06T 2207/10024; G06T
2207/20081; G06T 2207/30201; G06T
2207/30241; G06T 2207/30244; G06T
7/251; G06T 7/74; G06T 7/80
See application file for complete search history.

(56) References Cited

U.S. PATENT DOCUMENTS

| | | |
|---|---|---|
| 2021/0319240 A1 | 10/2021 | Demir et al. |
| 2021/0406719 A1 | 12/2021 | Yocam et al. |
| 2022/0414902 A1* | 12/2022 | Kannas .............. G06Q 30/0623 |

* cited by examiner

ARTIFICIAL INTELLIGENCE ARCHITECTURES FOR DETERMINING IMAGE AUTHENTICITY

RELATED APPLICATIONS

The present application is a continuation of U.S. application Ser. No. 17/355,965, filed Jun. 23, 2021, entitled, "ARTIFICIAL INTELLIGENCE ARCHITECTURES FOR DETERMINING IMAGE AUTHENTICITY," the entirety of which is incorporated by reference herein.

TECHNICAL FIELD

The present disclosure generally relates to validating the authenticity of digital images. More specifically (but not by way of limitation), the present disclosure relates to an artificial intelligence architecture for validating digital image authenticity.

BACKGROUND

Various scenarios, such as legal proceedings, criminal investigations, and identity-verification processes, can involve determining image authenticity. In such scenarios, determining image authenticity may be associated with significant results. For example, if a manipulated image is authenticated or is otherwise determined to be not manipulated in an identity-verification process, identity theft may result. Artificial intelligence (AI), or machine-learning, systems can be used to detect or otherwise determine whether an image is manipulated. But, challenges may exist when using an AI system for detecting whether the image is manipulated. For example, an attack can occur on the AI system in which an adversarial entity can engineer or otherwise generate a manipulated image that is designed to trick the AI system into determining that the manipulated image is not manipulated.

Adversarial entities can attack an AI system using one or more techniques. The techniques can include simple manipulations such as double-compression JPEGs and printing and scanning, which involves repetitions of physically altering an image, scanning the altered image, and printing the altered image. The techniques can additionally or alternatively include complex manipulations such as pixel-based attacks, which involve altering individual pixels and can involve large costs and an adversarial entity with a high level of expertise. While other AI systems have focused on detecting pixel-based attacks, simple manipulation attacks can still occur, and the other AI systems are at risk of not detecting the simple manipulation attacks.

SUMMARY

In one example, a system can include one or more processors and a non-transitory computer-readable medium including instructions for a trained machine-learning model that is executable by the processors to detect a manipulation of an image. The trained machine-learning model can include a constrained convolutional layer, separable convolutional layers, maximum-pooling layers, a global average-pooling layer, and a fully connected layer. The constrained convolutional layer can be configured to employ a filter that can include weights with a sum of zero for detecting image-manipulation fingerprints in the image. The constrained convolutional layer can generate a feature map associated with the image-manipulation fingerprints. The separable convolutional layers can be subsequent to the constrained convolutional layer and can be configured to perform a respective spatial convolution on each color channel of the image based on the feature map to generate feature maps corresponding to the image. The maximum-pooling layers can be interspersed between the separable convolutional layers. The global average-pooling layer can be subsequent to the separable convolutional layers and can average the feature maps to generate a vector of feature values. The fully connected layer can be subsequent to the global average-pooling layer and can receive the vector of feature values. The fully connected layer can output an indication of whether the image was manipulated or not manipulated.

In another example, a non-transitory computer-readable medium that includes instructions for a trained machine-learning model that is executable by one or more processors to detect a manipulation of an image. The trained machine-learning model can include a constrained convolutional layer that can be configured to employ a filter having a set of weights with a sum of zero for detecting one or more image-manipulation fingerprints in the image and generate a feature map associated with the image-manipulation fingerprints. The trained machine-learning model can include separable convolutional layers that are subsequent to the constrained convolutional layer. The separable convolution layers can be configured to perform a respective spatial convolution on each color channel of the image based on the feature map to generate feature maps corresponding to the image. The trained machine-learning model can include maximum-pooling layers that are interspersed between the separable convolutional layers. The trained machine-learning model can include a global average-pooling layer that can be subsequent to the separable convolutional layers for averaging the feature maps to generate a vector of feature values. The trained machine-learning model can include a fully connected layer that can be subsequent to the global average-pooling layer for receiving the vector of feature values and outputting an indication of whether the image was manipulated or not manipulated.

In another example, computer-implemented method can include receiving, by a processor, an image that is to be analyzed for authenticity. The computer-implemented method can include providing, by the processor, the image as input to a trained machine-learning model for detecting a manipulation of the image. The trained machine-learning model can include a constrained convolutional layer that can be configured to employ a filter having a set of weights with a sum of zero for detecting one or more image-manipulation fingerprints in the image and generate a feature map associated with the image-manipulation fingerprints. The trained machine-learning model can include separable convolutional layers that can be subsequent to the constrained convolutional layer. The separable convolution layers can be configured to perform a respective spatial convolution on each color channel of the image based on the feature map to generate feature maps corresponding to the image. The trained machine-learning model can include maximum-pooling layers that are interspersed between the separable convolutional layers. The trained machine-learning model can include a global average-pooling layer that can be subsequent to the separable convolutional layers for averaging the feature maps to generate a vector of feature values. The trained machine-learning model can include a fully connected layer that can be subsequent to the global average-pooling layer for receiving the vector of feature values and outputting an indication of whether the image was manipulated or not manipulated. The computer-implemented method can include receiving, by the processor, the indication of whether the image was manipulated or not manipulated from the trained machine-learning model. The computer-implemented method can include outputting, by the processor and based on the indication, a classification of the image as manipulated or not manipulated for display on a display device.

DETAILED DESCRIPTION

Figure 1:
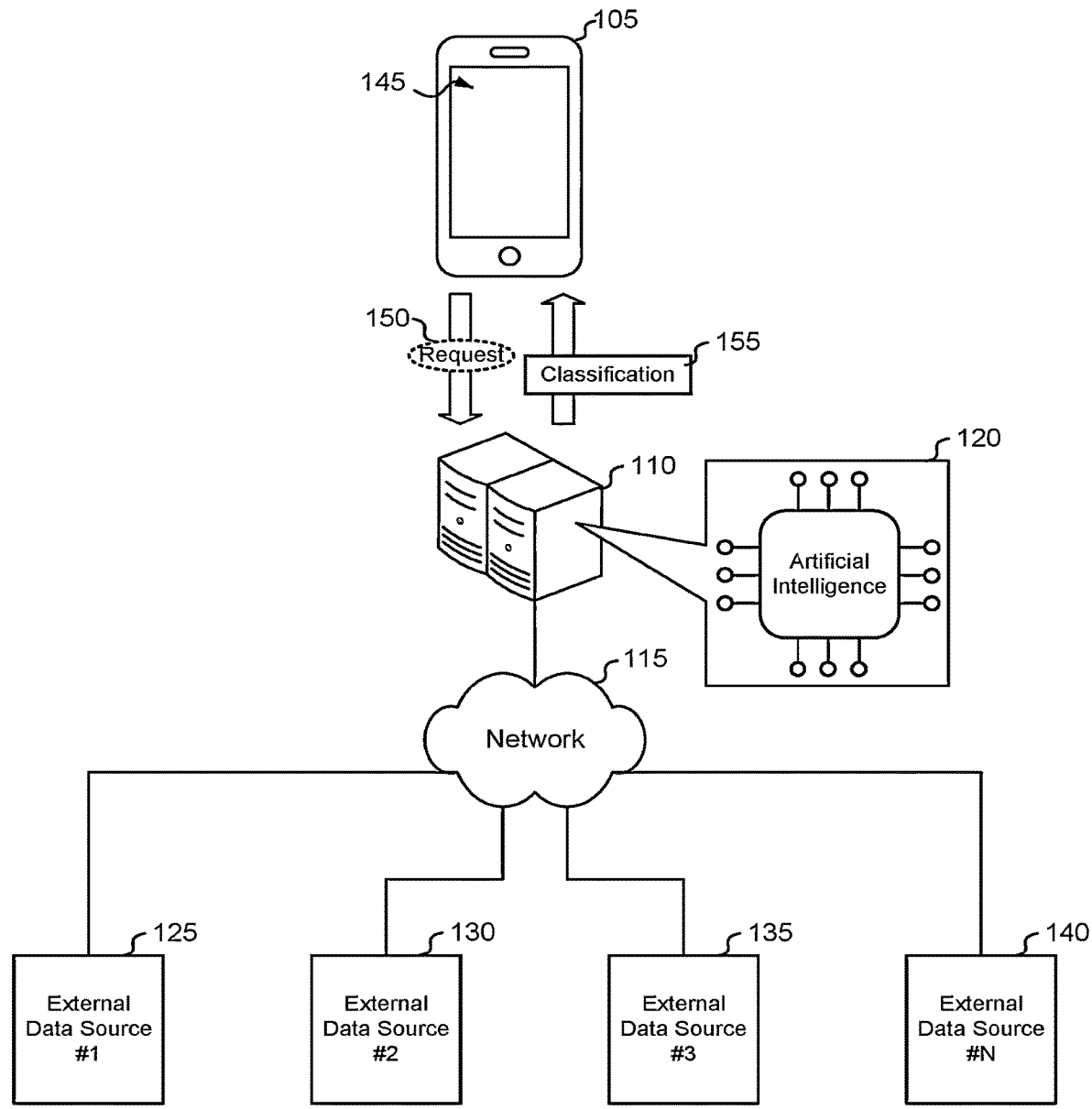
FIG. 1 is a block diagram illustrating an example of a network architecture of an image authentication system according to some examples of the present disclosure.

Certain aspects and features of the present disclosure relate to an artificial intelligence (AI) architecture configured to detect, or otherwise determine, whether an image has been manipulated via a print-and-scan attack or another type of image manipulation. A print-and-scan attack can involve printing out an image, physically modifying the printed image, and then scanning the modified image using a scanner. This process can obscure the manipulation of the image, thereby making it harder to detect such manipulations. In some cases, the modified image can be subsequently printed and scanned one or more additional times to further obscure the manipulation. Although such print-and-scan manipulations are typically performed maliciously, sometimes they occur unintentionally (e.g., by mistake). Either way, detecting the image manipulations may allow for a determination to be made about whether the image is authentic.

The AI architecture may include one or more trained AI, or machine-learning, models that may be trained to detect, or otherwise determine, whether the image has been manipulated via a print-and-scan attack. The AI models may be trained on historic data, manufactured data, or other suitable data for training the AI models to detect manipulations with respect to the image. The AI architecture may be configured to take, as an input, data relating to the image and may be configured to output a classification of the input image as manipulated or not manipulated via the print-and-scan attack. In some examples, the output from the AI architecture can also indicate a type (e.g., make and model) of a printer, a scanner, or both used in the attack.

In some examples, the AI architecture can include a convolutional neural network (CNN). The CNN can include a set of layers that are configured to allow the CNN to detect manipulations with respect to an input image. As one specific example, the set of layers can include a constrained convolutional layer, a convolutional layer, 34 separable convolutional layers, five pooling layers, and a fully connected layer. But, other suitable amounts of these types of layers can be included in the set of layers of the CNN for detecting the manipulations. Each convolutional layer may be followed by one or more rectifier linear units (ReLU) that can perform an activation function or other suitable function for the CNN.

The constrained convolution layer may constrain the CNN to learn image manipulation fingerprints or other indications of image manipulation (e.g., instead of image content or object recognition). In some examples, the constrained convolutional layer can be configured to generate a feature map with respect to an input image. For example, the constrained convolutional layer can generate the feature map that can be associated with image-manipulation fingerprints of the input image. The convolutional layer, which can be subsequent to the constrained convolutional layer, can convolve the feature map from the constrained convolutional layer, and can pass the feature map onto the separable convolutional layers.

The separable convolution layers can perform spatial convolutions with respect to the input image, which can be a color image with red, blue, and green (RGB) channels. For example, the separable convolution layers can perform a respective spatial convolution on each color channel of the input image based on a feature map to generate a set of feature maps corresponding to the image. The spatial convolution can be performed independently for each channel and can be followed by a point-wise, or 1×1, convolution.

The pooling layers can include maximum pooling layers, global average-pooling layers, and other suitable pooling layers with respect to the CNN. The maximum pooling layers can be interspersed within the CNN and can follow one or more separable convolutional layers. The maximum pooling layers can determine and output a maximum value with respect to one or more features of the feature maps. The global average-pooling layer can determine one or more averages with respect to the feature maps. In some examples, the global average-pooling layer can follow the separable convolutional layers. The global average-pooling layer can generate or otherwise determine an average of the feature maps that can be used to determine a vector of feature values.

In some examples, the fully connected layer can be configured to transmit a fully connected vector to a softmax layer for determining the output. The softmax layer can be a final layer with respect to the CNN and can use the vector of feature values to determine an output with respect to the input image. In other examples, the fully connected layer can determine a classification for the input image and can transmit the classification to the softmax layer for normalization and output. Either way, the output from the AI architecture can indicate whether the input image was manipulated via a print-and-scan attack, a type of printer and scanner used in the attack, and other suitable information relating to the attack. Additionally or alternatively, prediction error fields can be used by the CNN to classify global manipulation.

The CNN can be trained using various datasets. For example, the CNN can be trained on historic data, manufactured data, or other suitable data with respect to the input image or type of input image. The historic data can include existing images that include one or more manipulations (e.g., that have been modified via a print-and-scan attack) and information about printers that are associated with the existing images. The manufactured data can include manufactured images that are manipulated for training the CNN. By training with the historic data, the manufactured data, or both of these, a rate of detection of one or more manipulations with respect to an input image by the CNN can be improved. Additionally or alternatively, a number of free parameters can be decreased for allowing the CNN to learn effectively with a relatively small training set.

The AI architecture can be used to determine image authenticity in a variety of contexts, such as for validating loan applications or performing facial recognition. For example, the AI architecture can be used in a variety of processes for verifying authenticity of a set of input information. The input information can include one or more images of documents, identifications, or other suitable types of input information. Using the AI architecture may allow less input information to be used in some verification processes. For example, an entity can use the AI architecture to facilitate underwriting of a financial loan to an applicant by verifying authenticity of documents associated with the financial loan, and using the AI architecture can allow the entity to underwrite the financial loan with a subset of the input information (e.g., without using credit scores, etc.). Additionally or alternatively, the AI architecture can be used to verify authenticity of the input information to increase an authenticity confidence-level associated with the input information. For example, the entity can use the AI architecture to validate images of financial documents; validate images of a driver's license, passport, or other identification; or validate images of a person's face. This validation can be performed for any suitable purpose, such as to facilitate underwriting of the financial loan or to perform facial recognition, to increase a confidence level associated with the authenticity of the input information.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram illustrating an example of a network architecture 100 usable with an image authentication system 110 according to some examples of the present disclosure. The network architecture 100 can be configured to facilitate digital communications between a user device 105, the image authentication system 110, and external data sources (e.g., any one or more of external data sources 125-140). The external data sources can include images, image-related data, or other suitable data for the image authentication system 110.

The user device 105 can be any portable (e.g., smartphone, tablet computing device, laptop, etc.) or non-portable (e.g., electronic kiosk, desktop computer, etc.) computing device operated by a user or by another entity. While the network architecture 100 of FIG. 1 includes a single user device 105, the network architecture 100 can include any suitable number of user devices. The user device 105 can communicate with the image authentication system 110 by executing a native application 145 or by accessing a web server (not shown) that hosts a website operated by the image authentication system 110.

The image authentication system 110 can include a network of one or more servers and databases. The network within the image authentication system 110 can include a web server that hosts one or more webpages or an application server that hosts the native application 145. For example, the user device 105 can interact with the image authentication system 110 by transmitting a communication to the application server of the image authentication system 110 using the native application 145 executing on the user device 105.

The network 115 can be any type of network that facilitates digital communications between computing devices, using any of a variety of commercially-available protocols, including without limitation TCP/IP (transmission control protocol/Internet protocol), SNA (systems network architecture), IPX (Internet packet exchange), AppleTalk, and the like. In some implementations, the network 115 can be a cloud-based network. In other implementations, the network 115 can be an on-premises network associated with an enterprise. The network 115 can be a local area network (LAN), such as one based on Ethernet, Token-Ring and/or the like. Alternatively, the network 115 can be a wide-area network and the Internet, such as a virtual network, a virtual private network (VPN), an intranet, an extranet, a public switched telephone network (PSTN), an infra-red network, a wireless network, or any other suitable network or combination thereof.

Each of the external data sources 125-140 can include one or more databases of image or image-related data such as a printer database. The external data sources can be used to trained an AI model that can be included in the image authentication system 110. Each of the external data sources 125-140 can be any of a private database or a public database. For example, the external data source 125 can be a private database operated by a law firm that stores data that is viewable subsequent to an identity-verification process. As another example, the external data source 130 can be a publicly accessible database that includes images such as stock photos. The external data sources 125-140 can be operated by any third-party entity such as a private enterprise or a government entity.

Any combination of the computing devices illustrated in the network architecture 100 can communicate with each other. As one illustrative example, a user can transmit an image to the image authentication system 110 via the native application 145 of the user device 105. The transmitted image can include a request 150 to authenticate the image. The image authentication system 110 can apply an AI architecture 120 to the image to determine if one or more manipulations have been performed with respect to the image. The image authentication system 110 can output a classification 155 of the image as manipulated or not manipulated. The image authentication system 110 can transmit the classification 155 to the user device 105 for display. The components of the image authentication system 110 are described with respect to FIG. 2.

Figure 2:
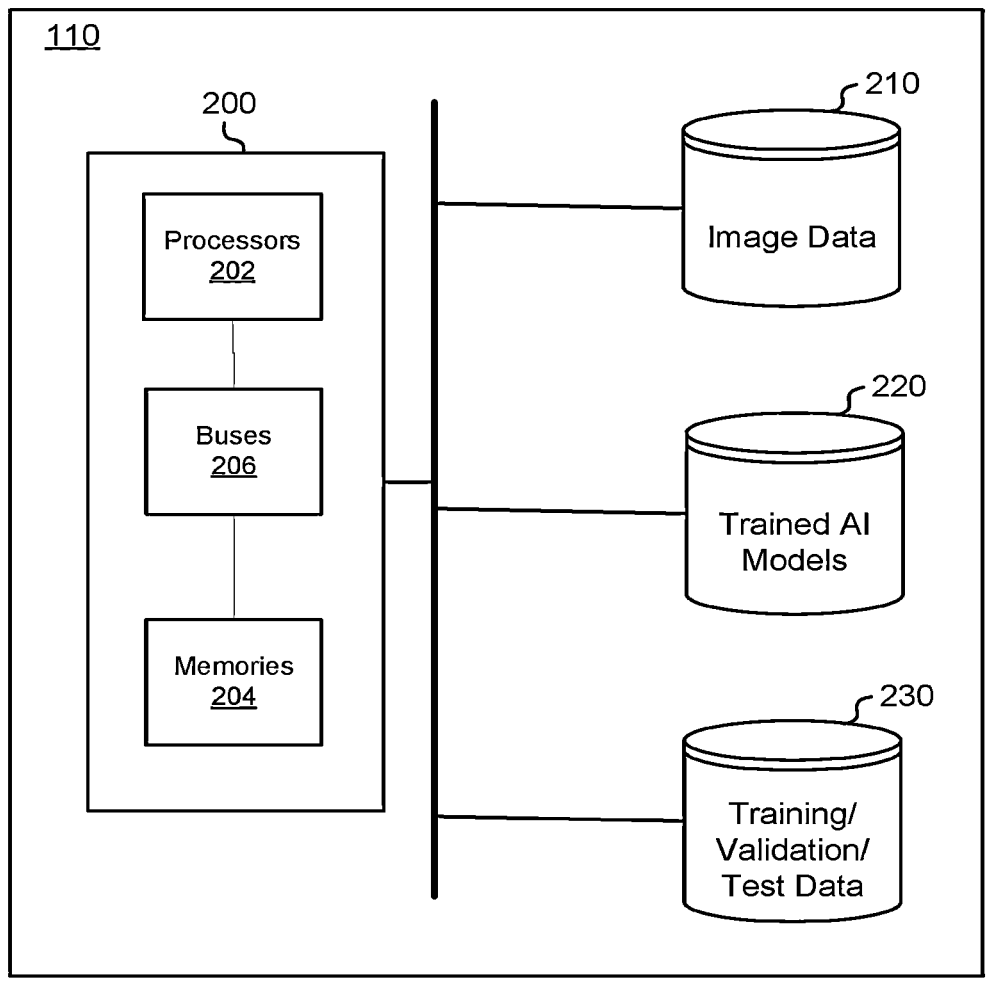
FIG. 2 is a block diagram illustrating another example of the image authentication system according to some examples of the present disclosure.

FIG. 2 is a block diagram illustrating an example of the image authentication system 110, according to certain aspects of the present disclosure. In some implementations, the image authentication system 110 includes a server 200, a database 210 storing image data, a database 220 storing trained AI models, and a database 230 storing training data, validation data, or test data for any of the trained AI models stored in database 220. The server 200 can store source code that, when executed, implements the AI architecture 120 illustrated in FIG. 1.

The server 200 can include one or more processors 202, one or more memories 204, and one or more buses 206. The processors 202 can execute one or more operations for determining authenticity of an input image. The processors 202 can execute instructions stored in the memory to perform the operations. The one or more processors 202 can include one processing device or multiple processing devices or cores. Examples of the processors 202 can include a Field-Programmable Gate Array ("FPGA"), an application-specific integrated circuit ("ASIC"), or a microprocessor.

The processors 202 can be communicatively coupled to the memories 204 via the buses 206. The memories 204 can include non-volatile memory, which can be any type of memory device that retains stored information when powered off. Examples of the memories 204 may include EEPROM, flash memory, or any other type of non-volatile memory. In some examples, at least part of the memories 204 can include a medium from which the processors 202 can read instructions. A computer-readable medium can include electronic, optical, magnetic, or other storage devices capable of providing the processors 202 with computer-readable instructions or other program code. Examples of a computer-readable medium include magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, Python, Java, or Pearl.

The database 210 can store image data such as original images that do not include manipulations, manipulated images, and other suitable image data. In some examples, the database 210 can include images that the image authentication system has processed and for which the image authentication system 110 has output one or more classifications 155. The image authentication system 110 can use the database 210, in addition to the database 230, to train the AI models included in the database 220.

The database 220 can store the one or more machine-learning models included in the AI architecture 120. For example, the database 220 can include the model artifact that is created in response to the training process, including, for example, hyperparameters (e.g., a number of layers), learnt parameters (e.g., feature weights or activation function outputs, etc.), or any other aspect that defines a machine-learning model.

In some implementations, the database 220 stores code that represents the various layers of the AI architecture 120. As an illustrative example, the database 220 can store code for a constrained convolutional layer, a convolutional layer, a set of separable convolutional layers, a set of maximum pooling layers, a global average-pooling layer, a fully connected layer, a softmax layer, and other suitable layers that can be included in the AI architecture 120.

The database 230 can store the training data, the validation data, the test data, or a combination of these for the various machine-learning models included in the AI architecture 120. The training data can include historical data, manufactured data, or other suitable data related to images, printers, and the like. The validation data can be used to validate the trained models. The test data can be used as an evaluation of the final trained model. The database 230 can also store any structured or unstructured user data retrieved from any external data source.

Figure 3:
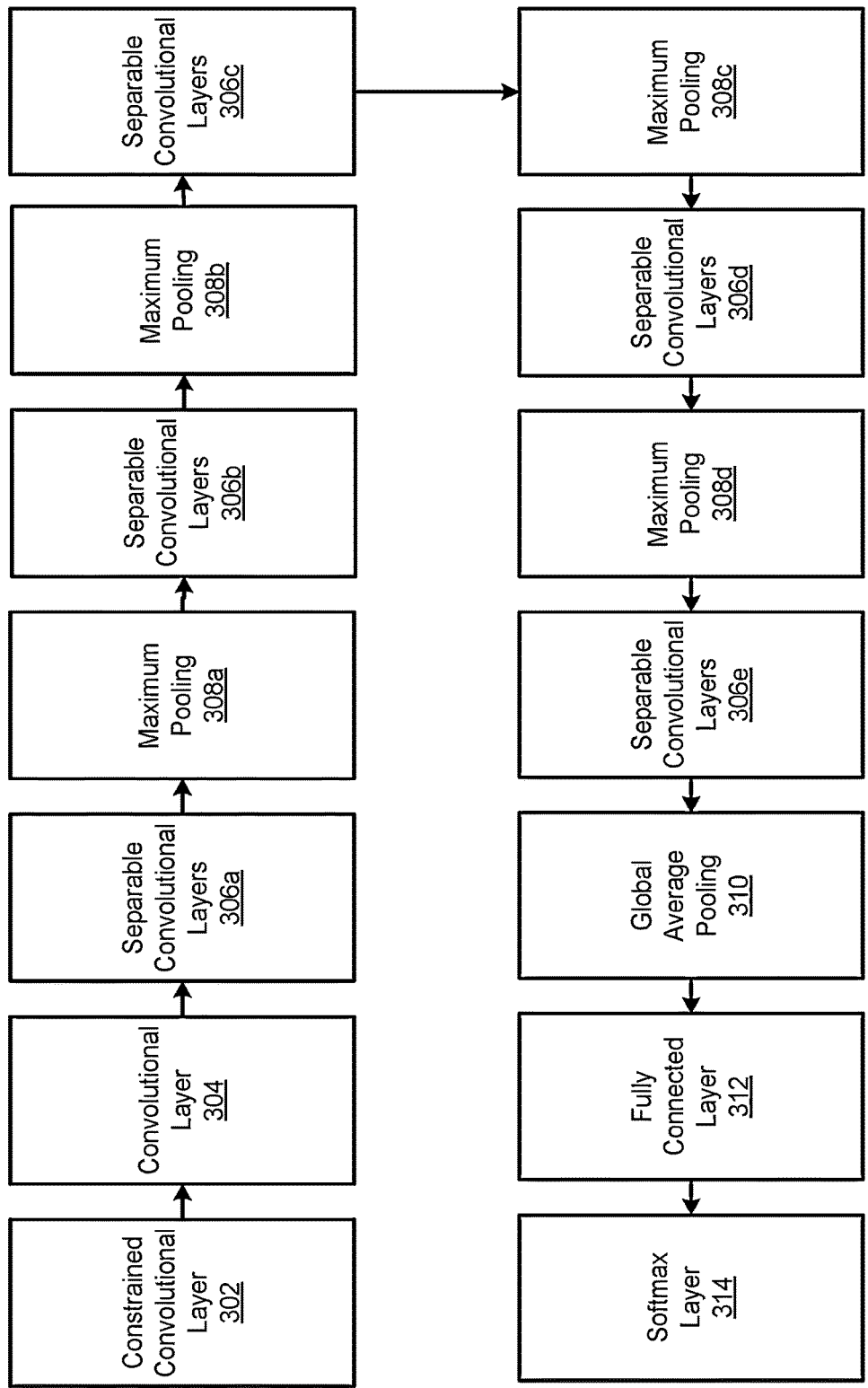
FIG. 3 is a block diagram illustrating an example of a machine-learning model for use in authenticating images according to some examples of the present disclosure.

FIG. 3 is a block diagram illustrating an example of a machine-learning model 300 that can be usable by the server 200 according to some examples of the present disclosure. The server 200 can be configured to apply the machine-learning model 300 to an input image to determine an authenticity of the input image or to otherwise execute the trained machine-learning model 300 for detecting one or more manipulations with respect to the input image. For example, the trained machine-learning model 300 can be configured to detect whether images have been manipulated by a print-and-scan attack. The trained machine-learning model 300 can include a constrained convolutional layer 302, a convolutional layer 304, a set of separable convolutional layers 306$a$-$e$, a set of maximum pooling layers 308$a$-$d$, a global average-pooling layer 310, a fully connected layer 312, and a softmax layer 314. The trained machine-learning model 300 can include suitable, additional or alternative layers or components for determining manipulations of the input image.

The constrained convolutional layer 302 can constrain the CNN to learn image manipulation fingerprints or other indications of image manipulation, for example indications of a print-and-scan attack. In some examples, the constrained convolutional layer can be configured to generate a feature map with respect to an input image. For example, the constrained convolutional layer 302 can generate the feature map that can be associated with image-manipulation fingerprints of the input image. The constrained convolutional layer 302 can learn the high-pass features of an image by attempting to predict a central pixel based on its neighbors. This can serve to suppress the image content and higher-order features for enabling the manipulation fingerprint to be learned.

In the constrained convolutional layer 302, a 5×5 filter can be employed in which the sum of weights is constrained to be zero. For example, a center pixel can be predicted based on other pixels in the field, and an output of the 5×5 filter can be interpreted as a prediction error. The weights in the 5×5 filter can be constrained such that:

$$\begin{cases} w(0, 0) & = -1 \\ \sum_{l,m \neq 0} w(l, m) & = 1 \end{cases}$$

where $\omega$ refers to the weight, and $l$ and $m$ refer to the coordinates in the filter, where (0, 0) is the central weight. The prediction error fields can be used as low-level forensic trace features by other layers or components of the trained machine-learning model 300 to assist in classifying global image manipulations. In some examples, the filter can be applied to the input image by the constrained convolutional layer 302 for determining the feature map.

The convolutional layer 304 that is subsequent to the constrained convolutional layer 302 can convolve the feature map from the constrained convolutional layer 302, and can pass the feature map onto the separable convolutional layers. A size of the constrained convolutional layer 302 can be different than a size of the convolutional layer 304. For example, the constrained convolutional layer 302 can include 32 dimensions, and the convolutional layer 304 can include 64 dimensions. The constrained convolutional layer 302 and the convolutional layer 304 can include other suitable sizes for convolving the input image and determining the feature map of the input image.

Separable convolutional layers 306$a$ can be positioned in the trained machine-learning model 300 subsequent to the convolutional layer 304, the constrained convolutional layer 302, or a combination thereof. As illustrated, the trained machine-learning model 300 includes five groups of separable convolutional layers 306$a$-$e$ that are interspersed throughout the machine-learning model 300, but more or fewer groups of separable convolutional layers 306 can be included in the machine-learning model 300. Each group of separable convolutional layers 306$a$-$e$ can include one or more separable convolutional layers. In one specific example, the separable convolutional layers 306a-e can include a total of 13 separable convolutional layers 306. For instance, the separable convolutional layers 306a can include a single separable convolutional layer, the separable convolutional layers 306b can include three separable convolutional layers, the separable convolutional layers 306c can include two separable convolutional layers, the separable convolutional layers 306d can include five separable convolutional layers, and the separable convolutional layers 306e can include two separable convolutional layers. But other examples may include more or fewer separable convolutional layers. In one such example, there can be between 30 and 40 separable convolutional layers in the machine-learning model 300. The separable convolutional layers in a particular group can be of the same size or different sizes. For example, the separable convolutional layers 306b can include a first separable convolutional layer of size 128 followed by two separable convolutional layers of size 256.

The separable convolutional layers 306a-e can perform respective spatial convolutions on each color channel of the input image based on the feature map generated by the constrained convolutional layer 302. The respective spatial convolutions can yield a set of feature maps that can correspond to the image. For example, the separable convolutional layers 306a-e can generate the feature maps based on the feature map from the constrained convolutional layer 302. The respective spatial convolution can be performed independently for each channel and can be followed by a point-wise or 1×1 convolution. Accordingly, a number of free parameters that allow the CNN to learn effectively with a minimal amount of training data can be decreased.

In some examples, the respective spatial convolutions can separate a kernel of the feature maps, or a color channel of one of the feature maps, into two smaller kernels. For example, the respective spatial convolution can separate a 15×15 kernel of the feature maps into a 15×1 kernel and into a 1×15 kernel. In this example, a convolution of the smaller kernels may involve 30 calculations, while a convolution of the large, 15×15 kernel may involve 225 calculations. In some examples, each separable convolutional layer 306 can perform a respective spatial convolution with respect to a corresponding color channel of the feature maps. For example, if feature maps include three color channels, then a separable convolutional layer 306 may perform the spatial convolution for one of the three color channels. In other examples, the separable convolutional layers 306 can be configured to decrease the size of the kernels associated with the feature maps for increasing computational efficiency and for increasing an ability of the trained machine-learning model to detect one or more generalized manipulations with respect to the input image. Accordingly, the separable convolutional layers 306 can be used to increase an amount of feature maps associated with the input image.

The separable convolutional layers 306 can be positioned in the machine-learning model 300 in an alternating pattern with the maximum pooling layers 308a-d. In some examples, the machine-learning model 300 can include between three and six (e.g., four) maximum pooling layers 308, but in other examples the trained machine-learning model 300 can include other suitable amounts of maximum pooling layers 308. The separable convolutional layers 306b can follow the maximum pooling layer 308a, the separable convolutional layers 306c can follow the maximum pooling layer 308b, and so on.

The maximum pooling layers 308a-d can have any suitable sizes (pooling operation sizes) and any suitable strides. In one example, the maximum pooling layers 308a-e can each have a size of three-by-three and a stride of two-by-two. The maximum pooling layers 308 can determine a maximum with respect to outputs from a preceding group of separable convolutional layers 306. For example, the maximum pooling layer 308a can determine a maximum with respect to feature maps output by the separable convolutional layers 306a. In some examples, the maximum determined by the a maximum pooling layer (e.g., maximum pooling layer 308a) can be passed to the subsequent group of separable convolutional layers (e.g., separable convolutional layers 306b). This process can continue until a last set of separable convolutional layers 306e performs the spatial convolution.

The separable convolutional layers 306e can output a set of feature maps and transmit the feature maps to the global average-pooling layer 310. The global average-pooling layer 310 can be configured to average the feature maps to generate a vector of feature values. The vector of feature values can include an N×1 matrix, or vector, in which N can represent an amount of features associated with the input image. In some examples, the amount of features can include 2048 features or another suitable amount of features. The global average-pooling layer 310 can transmit the vector of feature values to the fully connected layer 312, which can connect neurons of the machine-learning model 300. Accordingly, the fully connected layer 312 can determine, or facilitate determination of, one or more classifications of the input image using the vector of feature values. The fully connected layer 312 can transmit the vector of feature values, the classifications, or a combination thereof to the softmax layer 314.

The softmax layer 314 can be a last layer within the machine-learning model 300. The softmax layer 314 can include one or more softmax functions such as a normalized exponential function. In some examples, the softmax layer 314 can receive the classifications from the fully connected layer 312 and can perform a normalization on the classifications for determining whether a manipulation has been performed on the input image. In other examples, the softmax layer 314 can receive the fully connected vector of feature values, can perform one or more softmax functions on the vector of feature values, and can determine classifications with respect to the input image that can indicate whether a manipulation has been performed with respect to the input image. The softmax layer 314 can output the classifications to the server 200, which can transmit the classifications for display on a display device of a user device 105.

In some examples, the machine-learning model 300 can be a CNN that can be previously trained on a set of training images or data configured to imitate a print-and-scan attack. For example, the training images can include hundreds or thousands of images that were generated by printing out one or more images using a variety of printers, manipulating the physical (hard) copies of the images, and scanning the manipulated images using a variety of scanners. Generating the training images using one or more types of printers, one or more types of scanners, or both of these can improve the ability of the trained machine-learning model to detect image manipulations across a variety of hardware combinations. Accordingly, the CNN can learn one or more image-manipulation fingerprints corresponding to the print-and-scan attack.

The machine-learning model 300 can be trained on various datasets. The various datasets can include an original dataset, a manipulation dataset, a printer dataset, a composite dataset, or other suitable datasets for training the trained machine-learning model 300. The original dataset can include original images that do not include manipulations. The manipulation dataset can include one or more types of manipulations such as additive white Gaussian noise, Gaussian blurring, JPEG compression, median filtering, bilinear resampling, and other suitable types of manipulations. The printer dataset can include data relating to printed and scanned images from one or more types of printers and scanners. The composite dataset can include a combination of original, manipulated, and/or printed and scanned images.

By using the layer architecture and training images described above, the machine-learning model 300 can have a relatively high degree of accuracy in detecting image manipulations. For example, the trained machine-learning model 300 can achieve an accuracy of at least 75% with respect to data from the printer dataset, as compared to other models that may achieve accuracies of only 66.6% and 70.4% respectively. Additionally, the trained machine-learning model 300 can achieve an accuracy of at least 71% with respect to data from the composite dataset as compared to the other models, which respectively achieved accuracies of only 65.1% and 64.9%.

The machine-learning model 300 can be used to verify authenticity of various images. For example, the machine-learning model 300 can verify authenticity of images of documents that can be used as input for various processes. The processes can include loan underwriting, court proceedings, identity verification (e.g., facial recognition), and other suitable processes. The machine-learning model 300 can additionally verify authenticity of other types of images using the operations described herein.

It will be appreciated that the machine-learning model 300 shown in FIG. 3 is illustrative and not intended to be limiting. Other examples may include more layers, fewer layers, different layers, or a different combination of the layers shown in FIG. 3. For instance, in another example the machine-learning model 300 may exclude the softmax layer 314.

Figure 4:
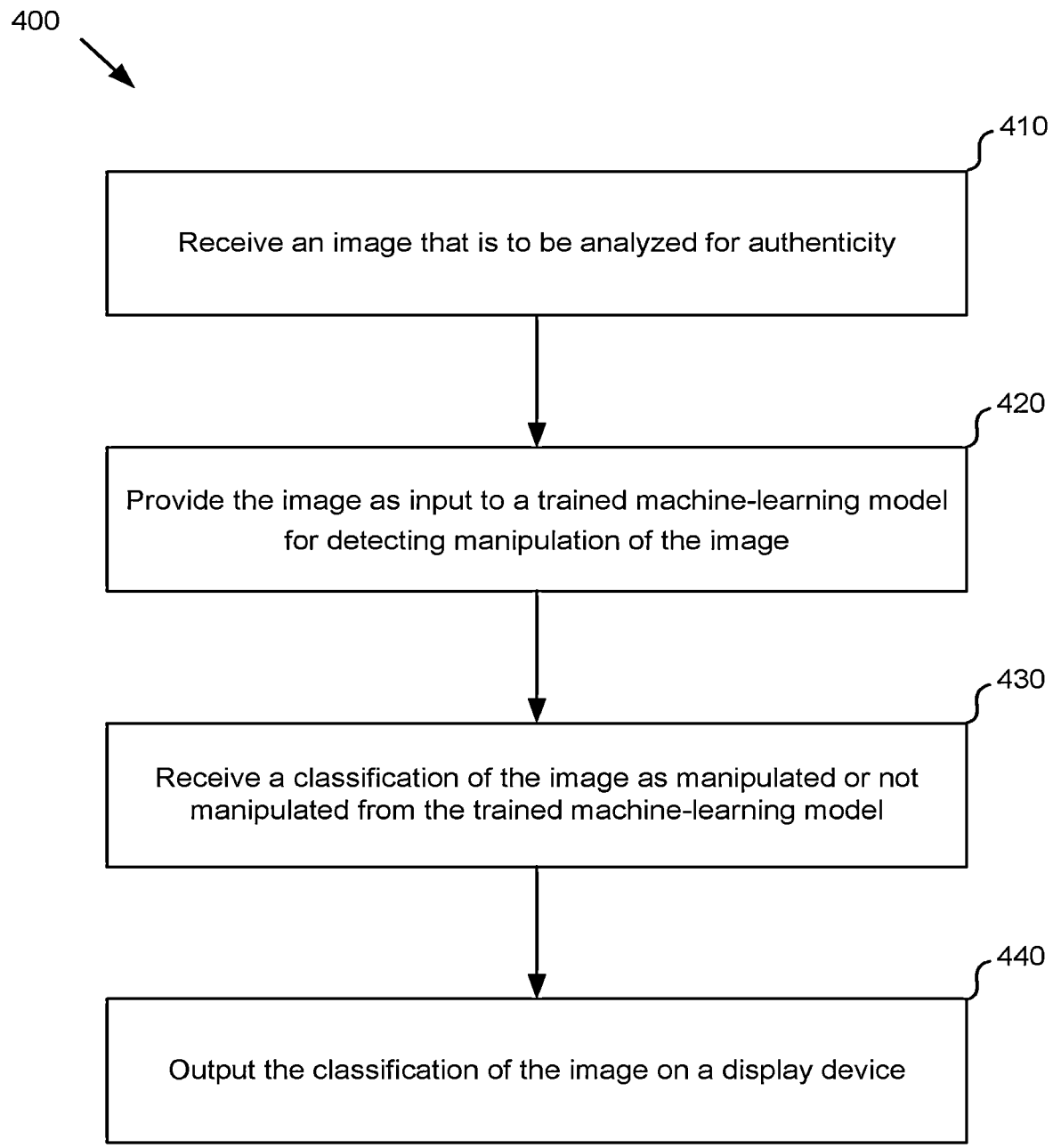
FIG. 4 is a flow diagram illustrating an example of a process for authenticating an image according to some examples of the present disclosure.

FIG. 4 is a flow diagram illustrating an example of a process 400 for authenticating an image, according to certain aspects of the present disclosure. The process 400 can be performed using any of the components described above with respect to FIGS. 1-3. For example, the server 200 can perform the process 400. Alternatively to the server 200, other suitable components of the image authentication system 110 can perform the process 400. The output of performing the process 400 includes a classification of an image as manipulated or not manipulated. For example, the process 400 can output an indication of whether the image was manipulated via a print-and-scan attack or not manipulated via a print-and-scan attack.

At block 410, the server 200 receives an image that is to be analyzed. The server 200 can receive the image via user input, via automatic input from a separate computing device that is communicatively coupled to the server 200, and the like. The image can be analyzed by the server 200 for determining whether the image was manipulated via a print-and-scan attack or another type of image manipulation.

At block 420, the server 200 provides the image as input to a trained machine-learning model 300 for detecting manipulation of the image. The trained machine-learning model 300 can be similar or identical to the trained machine-learning model 300 described with respect to FIG. 3. The trained machine-learning model 300 can be accessible to the server 200, and the server 200 can directly or indirectly input the image into the trained machine-learning model 300. In some examples, the trained machine-learning model 300 can be included on a separate computing device that can be communicatively coupled to the server 200. In these examples, the server 200 can transmit the image to the separate computing device, which in turn can input the image into the trained machine-learning model 300.

At block 430, the server 200 receives a classification of the image as manipulated or not manipulated from the trained machine-learning model 300. The trained machine-learning model 300 can perform a set of operations, such as the operations described with respect to FIG. 3, for determining the classification. For example, the trained machine-learning model 300 can determine a vector of feature values with respect to the image and can determine, using a softmax layer 314 or another approach, the classification using the vector of feature values. The trained machine-learning model 300 can provide the classification to the server 200. In some examples, a separate computing device that includes the trained machine-learning model 300 can transmit the classification to the server 200.

At block 440, the server 200 outputs the classification of the image for display on a display device. Examples of the display device can include a liquid crystal display (LCD) or a light-emitting diode (LED) display. The display device can be communicatively coupled to the server 200 and can be configured to display information relating to the image to entities such as a user of the server 200. The server 200 can output on the display device information indicating whether the image includes one or more manipulations, such as a print-and-scan manipulation. For example, if the classification indicates that the image is manipulated, the server 200 may output information on the display device indicating that the image is manipulated. In some examples, the server 200 can output one or more types of manipulations detected with respect to the image. In some examples in which the classification indicates that the image is not manipulated, the server 200 may output information on the display device indicating that the image is not manipulated.

Figure 5:
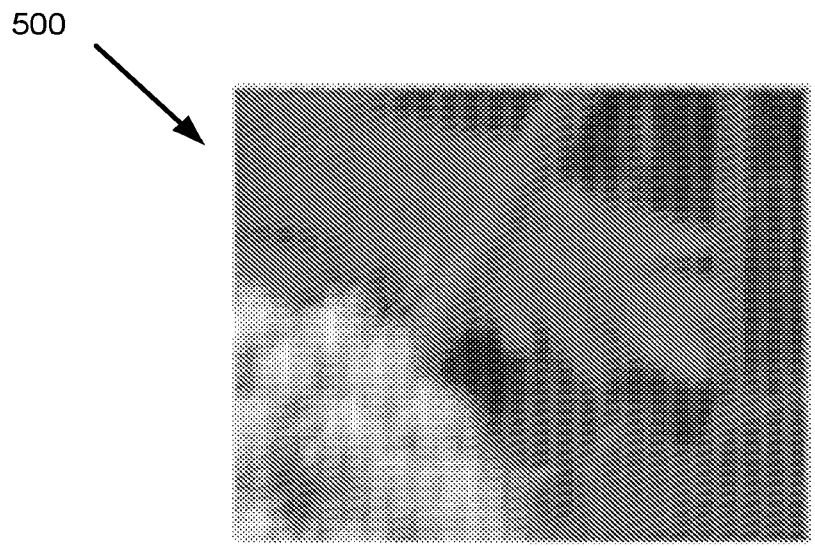
FIG. 5 is an example illustrating a manipulated image being detected using authentication processes according to some examples of the present disclosure.
Figure 5:
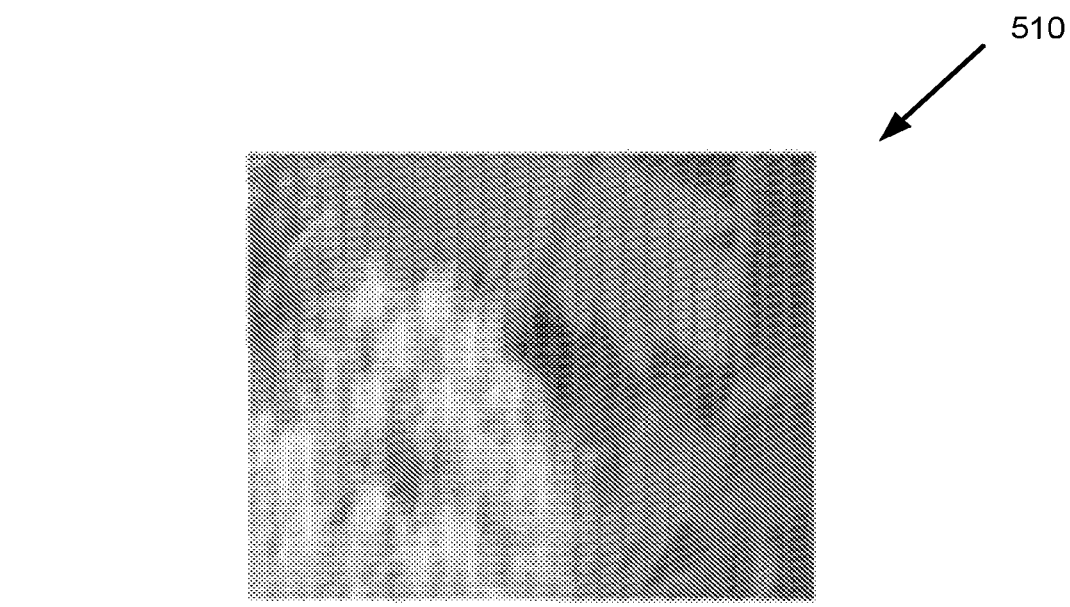

FIG. 5 is an example illustrating a manipulation performable with respect to an image 500 according to some examples of the present disclosure. The image 500 can be an original image that does not include a manipulation. The image 500 can be manipulated, whether maliciously, innocuously, or otherwise, using one or more manipulation techniques. For example, the manipulation techniques can include additive white Gaussian noise, Gaussian blurring, bilinear resampling, or other suitable manipulation techniques. A manipulated image 510 can result from performing one or more manipulation techniques with respect to the image 500. The manipulated image 510 may include pixels that have been directly or indirectly altered compared to pixels of the image 500. In some examples, the manipulated image 510 can result from an entity performing a print-and-scan attack.

The image authentication system 110 can detect the one or more manipulation techniques performed with respect to the image 500. For example, the manipulated image 510 can be input into a trained machine-learning model 300 included in the image authentication system 110. The trained machine-learning model 300 can output a classification with respect to the manipulated image 510. For example, the trained machine-learning model 300 can output a classification indicating that the manipulated image 510 was manipulated using a print-and-scan attack and a particular type of printer used to implement the print-and-scan attack.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A system comprising:
   one or more processors; and
   a non-transitory computer-readable medium including instructions for a trained machine-learning model that is executable by the one or more processors to detect a manipulation of an image, the trained machine-learning model including:
      a constrained convolutional layer configured to employ a filter for detecting one or more image-manipulation fingerprints in the image and to generate a feature map associated with the image-manipulation fingerprints;
      a plurality of separable convolutional layers configured to perform a respective spatial convolution on each color channel of the image based on the feature map to generate a plurality of feature maps corresponding to the image;
      a global average-pooling layer configured to average the plurality of feature maps to generate a vector of feature values; and
      one or more additional layers configured to output, based on the vector of feature values, an indication of whether the image was manipulated or not manipulated.

2. The system of claim 1, wherein the trained machine-learning model is configured to:
   detect whether the image was manipulated via a print-and-scan attack; and
   based on detecting that the image was manipulated via the print-and-scan attack, generate an output indicating a printer type used in the print-and-scan attack.

3. The system of claim 1, wherein the filter is at least a five-by-five filter, and the plurality of separable convolutional layers include at least 30 separable convolutional layers.

4. The system of claim 1, wherein the trained machine-learning model is a convolutional neural network trained on a set of training images configured to imitate a print-and-scan attack to enable the convolutional neural network to learn the one or more image-manipulation fingerprints corresponding to the print-and-scan attack.

5. The system of claim 4, wherein the set of training images includes a plurality of images generated using a plurality of different printers.

6. The system of claim 1, wherein the non-transitory computer-readable medium further includes instructions that are executable by the one or more processors to use the trained machine-learning model as part of a loan verification process to validate images relating to a loan application.

7. The system of claim 1, wherein the trained machine-learning model further comprises a plurality of max-pooling layers.

8. The system of claim 1, wherein the non-transitory computer-readable medium further includes instructions that are executable by the one or more processors to:
   provide the image as input to the trained machine-learning model, the trained machine-leaning model being configured to generate the vector of feature values and provide the vector of feature values from the global average-pooling layer to a fully connected layer, the fully connected layer being configured to provide the vector of feature values to a softmax layer, the softmax layer being configured to classify the image as manipulated or not manipulated based on the vector of feature values, wherein the one or more additional layers include the fully connected layer and the softmax layer; and
   receive the indication as output from the softmax layer of the trained machine-learning model.

9. A non-transitory computer-readable medium including instructions for a trained machine-learning model that is executable by one or more processors to detect a manipulation of an image, the trained machine-learning model including:
   a constrained convolutional layer configured to employ a filter for detecting one or more image-manipulation fingerprints in the image and to generate a feature map associated with the image-manipulation fingerprints;
   a plurality of separable convolutional layers configured to perform a respective spatial convolution on each color channel of the image based on the feature map to generate a plurality of feature maps corresponding to the image;
   a global average-pooling layer configured to average the plurality of feature maps to generate a vector of feature values; and
   one or more additional layers configured to output, based on the vector of feature values, an indication of whether the image was manipulated or not manipulated.

10. The non-transitory computer-readable medium of claim 9, wherein the trained machine-learning model is configured to, based on detecting that the image was manipulated via a print-and-scan attack, generate an output indicating a printer type used in the print-and-scan attack.

11. The non-transitory computer-readable medium of claim 9, wherein the filter is at least a five-by-five filter, and the plurality of separable convolutional layers include at least 20 separable convolutional layers.

12. The non-transitory computer-readable medium of claim 9, wherein the trained machine-learning model is a convolutional neural network trained on a set of training images configured to imitate a print-and-scan attack to enable the convolutional neural network to learn the one or more image-manipulation fingerprints corresponding to the print-and-scan attack.

13. The non-transitory computer-readable medium of claim 12, wherein the set of training images includes a plurality of images generated by using a plurality of different printers.

14. The non-transitory computer-readable medium of claim 9, further including instructions that are executable by the one or more processors to use the trained machine-learning model as part of a loan verification process to validate images relating to a loan application.

15. The non-transitory computer-readable medium of claim 9, wherein the trained machine-learning model further comprises a plurality of max-pooling layers.

16. The non-transitory computer-readable medium of claim 9, further including instructions that are executable by the one or more processors to:
   provide the image as input to the trained machine-learning model, the trained machine-leaning model being configured to generate the vector of feature values and provide the vector of feature values from the global average-pooling layer to a fully connected layer, the fully connected layer being configured to provide the vector of feature values to a softmax layer, the softmax layer being configured to classify the image as manipulated or not manipulated based on the vector of feature values, wherein the one or more additional layers include the fully connected layer and the softmax layer; and receive the indication as output from the softmax layer of the trained machine-learning model.

17. A method comprising:

receiving, by a processor, an image that is to be analyzed for authenticity;

providing, by the processor, the image as input to a trained machine-learning model for detecting a manipulation of the image, wherein the trained machine-learning model includes:
  a constrained convolutional layer configured to employ a filter for detecting one or more image-manipulation fingerprints in the image and to generate a feature map associated with the image-manipulation fingerprints;
  a plurality of separable convolutional layers configured to perform a respective spatial convolution on each color channel of the image based on the feature map to generate a plurality of feature maps corresponding to the image;
  a global average-pooling layer configured to average the plurality of feature maps to generate a vector of feature values; and
  one or more additional layers configured to output, based on the vector of feature values, an indication of whether the image was manipulated or not manipulated;

receiving, by the processor, the indication of whether the image was manipulated or not manipulated from the trained machine-learning model; and outputting, by the processor and based on the indication, a classification of the image as manipulated or not manipulated for display on a display device.

18. The method of claim 17, further comprising:
generating the feature map at the constrained convolutional layer by applying the filter to the image;
generating the plurality of features maps at the plurality of separable convolutional layers by performing the respective spatial convolution on each color channel of the image;
generating the vector of feature values at the global average-pooling layer by averaging the plurality of feature maps; and
determining the indication based on the vector of feature values.

19. The method of claim 17, wherein the trained machine-learning model is configured to detect whether images have been manipulated by a print-and-scan attack, wherein the trained machine-learning model is a convolutional neural network trained on a set of training images configured to imitate the print-and-scan attack to enable the convolutional neural network to learn the one or more image-manipulation fingerprints corresponding to the print-and-scan attack, and wherein the set of training images includes a plurality of images generated by using a plurality of different printers.

20. The method of claim 19, wherein the trained machine-learning model is configured to, based on detecting that the image was manipulated via the print-and-scan attack, generate an output indicating a printer type used in the print-and-scan attack.

* * * * *